United States Patent [19]

Messinger et al.

[11] Patent Number: 4,562,661
[45] Date of Patent: Jan. 7, 1986

[54] FISH LURE WITH CONCEALED HOOKS

[76] Inventors: Donald J. Messinger, 9621 Vermont Hill Rd.; William J. Zugger, S-8387 Vermont Hill Rd., both of Holland, N.Y. 14080

[21] Appl. No.: 690,209

[22] Filed: Jan. 10, 1985

[51] Int. Cl.⁴ .............................................. A01K 83/02
[52] U.S. Cl. ....................................................... 43/35
[58] Field of Search .................... 43/42.41, 34, 35, 41, 43/42.42, 42.1, 42.44

[56] References Cited

U.S. PATENT DOCUMENTS

| | | | |
|---|---|---|---|
| 1,697,120 | 1/1929 | Johns | 43/35 |
| 2,079,509 | 5/1937 | Kettring | 43/35 |
| 2,326,620 | 8/1943 | Charpentier | 43/35 |
| 2,729,013 | 1/1956 | Chandler | 43/35 |
| 3,018,582 | 1/1962 | Anderson | 43/35 |
| 3,646,699 | 3/1972 | Zeman | 43/35 |

Primary Examiner—Gene P. Crosby
Attorney, Agent, or Firm—E. Herbert Liss

[57] ABSTRACT

A hollow body preferably simulating prey for game fish is slotted on its dorsal and ventral surfaces. At one slot a lever in the form of a body part of the prey is pivotally secured with a portion extending inwardly and a portion exposed. At the other slot a fish hook is pivotally mounted. A spring within the hollow body extends between and engages the fishhook and the lever. When the fishhook is depressed to a concealed position within the hollow body, the spring is compressed; a catch on the hook engages a keeper on the lever to retain the hook within the body. If a game fish strikes the lure and depresses the exposed portion of the lever, the lever pivots to a position which releases the catch from the keeper and permits the spring to eject the hook to an external position where it can hook the game fish.

6 Claims, 4 Drawing Figures

FISH LURE WITH CONCEALED HOOKS

This invention relates to fishing lures and, more particularly, to fishing lures having retractable hooks which are ejected in response to a strike.

BACKGROUND OF THE INVENTION

A fishing lure generally is in the form of a simulated prey for game fish such as a small fish or insect with one or more depending sharp pointed barbed hooks attached to it. The barbed hooks tend to collect weeds and debris when dragged through the water; this renders them ineffective for catching fish. Large debris may cause damage to the fishing rod or break the line. Exposed hooks can cause lacerations when the fishing tackle is being assembled or when the fisherman reaches into his tackle box. The hooks also become entangled in fish line and with other equipment when the tackle container is being moved about.

Lures known in the prior art in which the hooks are concealed within the body of the lure and are designed to be exposed in response to a fish strike exhibit certain deficiencies relating to design complexity and function. Exemplary of the prior art devices of this kind are the type which require a multiplicity of events to occur for actuation—a fish strike and a pull on the fish line to effect ejection of the hook, for example. During such a sequence a striking fish can readily escape. Others, as for example the lure shown in Johns U.S. Pat. No. 1,697,120 issued Jan. 1, 1929 utilize complex linkage structures through which the hooks are triggered. Johns discloses a lever having an exposed portion in the form of a fin which actuates a linkage member; in turn a cam is rotated against the urging of a spring which releases a pair of hooks coupled by an integral coil spring. The articulated linkage assembly involves a number of corrosion susceptable connections, particularly in salt or high mineral content water. The number of parts and assembly increases the cost. Tolerances between the parts or wear can cause idle motion to slow the action permitting the fish to escape. A linearly projected rod having hooks at the end and triggered by an exposed lever is shown in Chandler, U.S. Pat. No. 2,729,013 issued Jan. 3, 1956. The lever moves with the rod and could become jammed due to a collection of sea weed and debris, thereby preventing ejection of the hooks. Furthermore a strike from the side of the lure would permit the fish to escape. Other known lures with concealed hooks include passive projection types where the concealed hook is not spring urged but merely assumes an external position by gravitational action; yet others include hooks which are continuously biased to concealed position and which project only when the actuating means is depressed. These types tend to be ineffective because upon release by the fish the hook can return to concealed position without engaging the fish.

SUMMARY OF THE INVENTION

The improved, simplified mechanism of this invention for releasably retaining a retractable fishhook in concealed position is shown incorporated in a lure simulating a bait fish although a lure of any suitable shape and size attractive to game fish may be employed. The lure comprises a body having dorsal and ventral slots. A lever in the form of a fin is pivotally mounted in one of the slots and a fish hook is pivotally mounted for ejection to an exposed position through the other slot. The improvement relates to the biasing means for urging the hook and the lever to exposed position and the latch means for releasably retaining the hook in concealed position within the hollow body of the lure, permitting ejection to an exposed position when a game fish bites the lure.

A single spring acting directly upon both the hook and the lever urges both to exposed position. Catch means which is a fixed element on the hook directly engages a keeper which is a fixed element on the lever. Because of the absence of intermediate linkage and the direct acting spring, depression of the lever when a game fish strikes results in rapid ejection of the fishhook to operative position eliminating lost or idle motion. The simplicity and minimum number of parts together with absence of articulated joints reduces exposure to failure due to corrosion and wear as well as minimizing the chance of blockage due to collection of seaweed and other debris found in fishing waters.

The principle object of the present invention is to provide a durable, rapid acting, simple, economical retractable hook type fish lure which avoids lost motion and minimizes exposure to failure.

Other objects and advantages of the invention will be apparent from the following detailed description taken in connection with the accompanying drawings.

DETAILED DESCRIPTION OF THE DRAWINGS

DETAILED DESCRIPTION

Figure 1:
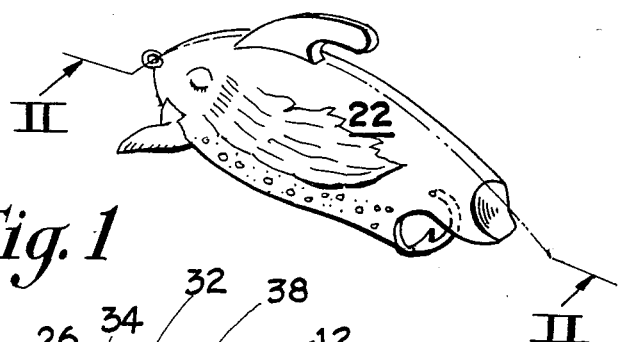
FIG. 1 is a perspective view of the assembly of this invention embodied in a simulated fish.
Figure 2:
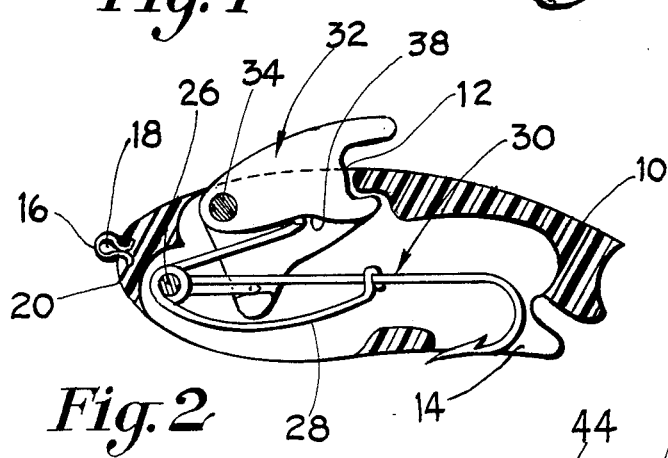
FIG. 2 is a longitudinal section view taken on line II—II of FIG. 1.
Figure 3:
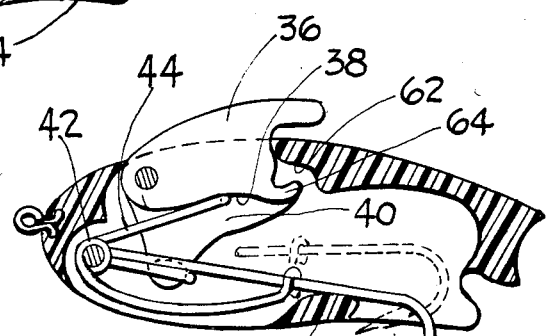
FIG. 3 is a view similar to FIG. 2 illustrating the fish hook in projected position and in concealed position in dotted lines.

In FIGS. 1 to 3 a fish lure is illustrated comprising a hollow body 10 the size and shape of a small bait fish. The hollow body may be formed to simulate other and different types of prey attractive to game fish. It includes a dorsal slot 12 and a ventral slot 14. An eye loop 16 may be provided for attaching the lure to a line 18 at its proximal end 20. Adjacent the proximal end 20 of the body 10 extending transversely between sidewalls 22 and 24 is a shaft 26. The shaft 26 serves as a common axis for hair pin spring 28 and fish hook 30. A lever 32 as illustrated simulates a dorsal fin; it is pivoted on a second transverse axis 34 extending between side walls 22 and 24 at the proximal end of slot 12. The lever 32 comprises an external portion 36 defined by a ventrally facing shoulder 38 and an internal portion 40 having a dorsally facing shoulder 57 at its lower extremity.

Figure 4:
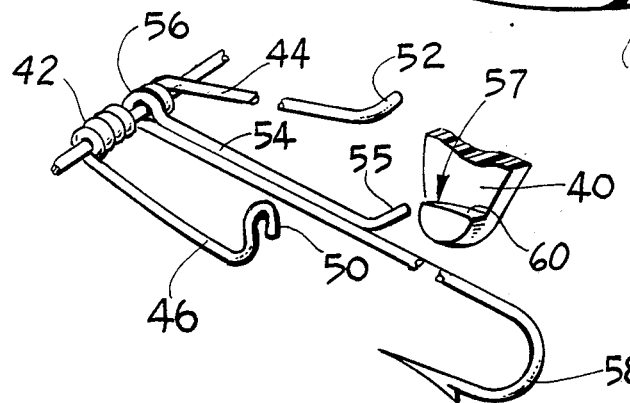
FIG. 4 is an exploded perspective view of the operative mechanism.

The fish hook or hook element 30 includes a shank portion 54 having a transversely extending medial offset portion 55; an eye loop 56 journaled on axis 26 is formed at the proximal end of shank 54 and a reversely bent portion terminating in a barbed end 58 forms a barbed hook at the distal end. The medial offset in the shank poriton 54 may lie below the hook element 30, as shown in FIGS. 2 and 3 by way of example, or above the hook element as shown in FIG. 4 by way of example.

The hair pin spring 28 comprises a coil 42 at its apex. A pair of legs 44 and 46 extend one from each end of the coil forming an acute angle. Leg 46 has a laterally offset U-shaped terminus 50; the leg 44 is bent to form a lateral lug 52 at its end. The axis 26 is journaled in the opening defined by the coil 42.

The offset terminus 50 of leg 46 engages and urges the hook element 30 through dorsal slot 14 to its exposed position. Lateral lug 52 at the end of leg 44 of spring 28 engages shoulder 38 on the lever 32 to urge the lever 32 to its outermost position. The transversely extending offset 55 is engageable with shoulder 57 to retain the hook element 30 in a concealed position within the hollow body 10 against the urging of spring 28. Shoulder 57 includes an inclined surface 60 sloping upwardly toward the trailing or distal end for resisting inadvertent disengagement.

An undercut portion 62 at the distal end of dorsal slot 12 engages a lug 64 on lever 32 and serves as stop means to limit the outward motion of lever 32. Similarly, an abutment 66 at the proximal edge of slot 14 is positioned to engage the shank 54 of fishhook 30 serving as stop means to prevent excessive outward displacement of the fishhook.

It should now be apparent that a unique retractable hook fish lure has been provided which is rapid acting, includes a minimum number of parts and avoids articulated linkage subject to corrosion and collection of debris. Biasing means illustrated as hair pin spring 28 extends between and directly engages lever 32 and fishhook 30 to urge the fishhook and the lever outward through slots 14 and 12, respectively. A catch in the form of lateral offset 55 is in direct releasable engagement with a keeper shown as shoulder 57 on lever 32. When the pivotally mounted lever 32 is depressed the catch is released from the keeper allowing the biasing means to effect rapid ejection of the fish hook from a concealed position within the hollow body 10 to an exposed position.

In use a force is applied to the shank 54 of the fishhook 30 to depress the hook element 30 into the hollow body 10 until the offset 30 engages the shoulder 42 whereupon the hook is latched within the hollow body. In this state the lure can be safely stored or tied to a fish line for use. When the line and lure are dropped into the water at the fishing site, the lure can be moved about without gathering seaweed or other debris. If a fish strikes it will depress the exposed lever 32 thereby releasing the hook in the mouth of the fish.

A certain specific embodiment of the invention has been shown and described for the purpose of illustration but it will be apparent that various modifications and other embodiments are possible within the scope of the invention. For example, in accordance with the broader aspects of the invention the hollow body may take any suitable shape or form attractive to game fish; other and different forms of direct engaging latches or biasing means may be employed. It is to be understood, therefore, that the invention is not limited to the specific arrangement shown but inits broadest aspects it includes all equivalent embodiments and modificatins which come within the scope of the invention.

What is claimed is:

1. In a fish lure construction including a hollow body having slots through opposed dorsal and ventral surfaces thereof, a retractable fishhook having a shank terminating in a barbed hook at the distal end and pivotally secured at its proximal end adjacent an end of the lure on a first transverse axis within said hollow body, said hook being positioned to pivot to and fro from a position within said hollow body to a projecting position wherein the barbed hook portion projects externally through one of said slots; wherein the improvement comprises biasing means directly engageable with said hook for urging said hook to said external position, a lever pivotally mounted on a second transverse axis displaced from said first transverse axis, said lever having an external portion extending outwardly through the other of said slots and an internal portion extending into said hollow body, said biasing means extending into engagement with said lever and urging said lever to its outermost position, a keeper on said internal portion and a catch on said shank, said keeper and said catch being directly engageable for retaining said hook within said hollow body against the urging of said biasing means, said lever being pivotable from a position for retaining said keeper and catch in direct engagement to a position to release said catch on said shank from said keeper when said lever is depressed whereby said biasing means causes said hook to project externally of said body.

2. In a fish lure construction according to claim 1 wherein said biasing means comprises a hairpin spring having a coil at its apex and a leg extending from each end of said coil, said legs forming an acute angle, said coil being positioned on a common axis with said fishhook, one leg of said spring engaging said lever at a position displaced from the pivotal axis, the other leg engaging a medial portion of said shank.

3. In a fish lure construction according to claim 1 wherein said catch comprises a laterally offset portion intermediate the ends of said shank and said keeper comprises a shoulder on the internal portion of said lever positioned to engage said laterally offset portion when said hook member is depressed into said body against the urging of said biasing means.

4. In a fish lure construction according to claim 3 wherein said shoulder on said lever includes an inclined surface for resisting inadvertent disengagement from said catch.

5. In a fish lure construction including a hollow body having slots through opposed dorsal and ventral surfaces thereof, a hook element having a shank terminating in a barbed hook at the distal end and having its proximal end pivotally secured about a first transverse axis adjacent an end of the lure within said hollow body, said hook element being positioned to pivot from an internal position concealed within said hollow body to an external position and vice verse through one of said slots, a lever pivotally secured on a second transverse axis displaced from said first transverse axis, said lever having an external portion extending outwardly through the other of said slots and an internal portion extending into said hollow body; wherein the improvement comprises in combination a hairpin spring having a coil at its apex supported on said first transverse axis, each end of said coil terminating in a leg, said legs forming an acute angle, one of said legs engaging said lever to bias it to its outermost position through said other slot, the other of said legs having an offset U-shaped terminus embracing said shank intermediate its ends to bias said hook element outwardly through said one slot, said internal portion of said lever having a shoulder, said shank having a transversely extending medial offset portion positioned to engage said shoulder when said hook member is depressed into said hollow body against the urging of said spring to thereby retain said hook within said hollow body, said lever being pivotable to a position to disengage said offset portion from said shoulder whereby the other of said legs of said spring causes said hook to project externally of said body.

6. In a fish lure construction according to claim 5 wherein said shoulder on said lever includes an inclined surface sloping upwardly toward the trailing end of the shoulder for resisting inadvertent disengagement from said offset portion.

* * * * *